US012600578B2

(12) United States Patent
Kageyama

(10) Patent No.: US 12,600,578 B2
(45) Date of Patent: Apr. 14, 2026

(54) SUPPLY APPARATUS

(71) Applicant: Ishida Co., Ltd., Kyoto (JP)

(72) Inventor: Toshiharu Kageyama, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 172 days.

(21) Appl. No.: 18/426,284

(22) Filed: Jan. 29, 2024

(65) Prior Publication Data

US 2024/0270507 A1 Aug. 15, 2024

(30) Foreign Application Priority Data

Feb. 15, 2023 (JP) ................................. 2023-021820

(51) Int. Cl.
B65G 47/72 (2006.01)
B65G 43/08 (2006.01)
(Continued)

(52) U.S. Cl.
CPC ............. B65G 47/72 (2013.01); B65G 43/08 (2013.01); B65G 47/766 (2013.01);
(Continued)

(58) Field of Classification Search
CPC .... B65G 43/08; B65G 47/5195; B65G 47/72; B65G 47/766; B65G 2203/0258;
(Continued)

(56) References Cited

U.S. PATENT DOCUMENTS 3,543,916 A * 12/1970 Berk .................... B65G 47/766
198/525
4,678,046 A * 7/1987 Mosher ................ G01G 19/393
177/1
(Continued)

FOREIGN PATENT DOCUMENTS

CN 210884128 U 6/2020
CN 112938440 A 6/2021
(Continued)

OTHER PUBLICATIONS

The extended European search report issued by the European Patent Office on Jun. 13, 2024, which corresponds to European Patent Application No. 24153560.8-1017 and is related to U.S. Appl. No. 18/426,284.

*Primary Examiner* — Gene O Crawford
*Assistant Examiner* — Keith R Campbell
(74) *Attorney, Agent, or Firm* — Studebaker Brackett PLLC

(57) ABSTRACT

A supply apparatus (10) includes: a blocker (13) disposed at a fork (12) between a main conveyance path (11), a first conveyance path (12A), and a second conveyance path (12B), the blocker (13) making a switch between a first state where supply of articles from the main conveyance path (11) to the first conveyance path (12A) is blocked and a second state where supply of the articles from the main conveyance path (11) to the second conveyance path (12B) is blocked;
(Continued)

and a controller (20) that transitions, based on respective conditions of supply of the articles to two adjacent combination weighing mechanisms (1A, 1B), the blocker (13) into at least either the first state or the second state to switch a route of conveyance of the articles.

5 Claims, 6 Drawing Sheets

(51) Int. Cl.
    *B65G 47/76*           (2006.01)
    *G01G 13/02*           (2006.01)
    *G01G 19/393*         (2006.01)

(52) U.S. Cl.
    CPC ......... *G01G 13/026* (2013.01); *G01G 19/393* (2013.01); *B65G 2203/0258* (2013.01); *B65G 2811/0657* (2013.01); *B65G 2811/0678* (2013.01)

(58) Field of Classification Search
    CPC .... B65G 2811/0657; B65G 2811/0678; G01G 13/026; G01G 19/387; G01G 19/393; B65B 1/32; B65B 37/18; B65B 57/14
    See application file for complete search history.

(56)             References Cited

U.S. PATENT DOCUMENTS

| | | | | |
|---|---|---|---|---|
| 5,753,867 | A * | 5/1998 | Konishi | G01G 19/393 |
| | | | | 177/25.18 |
| 6,235,998 | B1 * | 5/2001 | Brewer | B65G 47/72 |
| | | | | 198/370.01 |
| 8,569,634 | B2 * | 10/2013 | Kageyama | G01G 19/393 |
| | | | | 177/25.18 |
| 10,006,802 | B2 * | 6/2018 | Kageyama | B65G 27/32 |
| 10,023,391 | B2 * | 7/2018 | Taylor | B65B 1/32 |
| 10,196,212 | B1 * | 2/2019 | Gwon | B30B 15/32 |
| 2003/0127302 | A1 * | 7/2003 | Brewer | B65G 47/72 |
| | | | | 198/436 |
| 2007/0108016 | A1 | 5/2007 | Eaton et al. | |
| 2009/0133939 | A1 * | 5/2009 | Taylor | G01G 19/393 |
| | | | | 177/100 |
| 2018/0045555 | A1 * | 2/2018 | Iwasa | G01G 13/04 |
| 2022/0034030 | A1 | 2/2022 | Miyasaka | |

FOREIGN PATENT DOCUMENTS

| | | | |
|---|---|---|---|
| DE | 44 06 561 | C1 | 9/1995 |
| JP | H07-328552 | A | 12/1995 |
| JP | 3209972 | U | 4/2017 |
| WO | 01/27568 | A1 | 4/2001 |

* cited by examiner

SUPPLY APPARATUS

CROSS-REFERENCE TO RELATED APPLICATIONS

This application is based upon and claims the benefit of priority from Japanese Patent Application No. 2023-021820 filed on Feb. 15, 2023 in Japan, the entire contents of which are incorporated herein by reference.

TECHNICAL FIELD

The present invention relates to a supply apparatus.

BACKGROUND ART

In a configuration in which two packing apparatuses operate together to a single combination weighing mechanism, namely, in a twin operative configuration, in order to supply weighing targets (articles) to the weighing mechanism, the following two methods have been known conventionally.

One of the two methods is a method of controlling supply of weighing targets to each channel with a sorter provided below a single supply apparatus.

The other of the two methods is a method of supplying weighing targets to the individual distribution table of each channel with two supply apparatuses.

SUMMARY OF THE INVENTION

Technical Problem

However, according to the first method described above, because a sorting mechanism including an open/close gate is provided between the supply apparatus and the weighing mechanism, the installation height is high, leading to a low degree of freedom of layout as a disadvantage.

In addition, according to the first method described above, because an intricate mechanism is disposed above weighing targets, as a disadvantage, a deterioration is likely to occur in hygiene due to foreign matter contamination or residual weighing targets.

Furthermore, according to the first method described above, with a back-to-back feeder installed at the center of the weighing mechanism, control of supply of weighing targets to the distribution table of each channel is required, leading to an intricate machinery configuration as a disadvantage.

According to the second method described above, a plurality of supply apparatuses requires preparing, and a plurality of distributors following a main supply line are required, leading to a rise in cost as a disadvantage.

Thus, the present invention has been made in consideration of the above problems, and an object of the present invention is to provide a supply apparatus capable of sorting weighing targets efficiently and requiring no intricate mechanism between the supply apparatus and a weighing mechanism, leading to a low installation height.

Solution to Problem

A supply apparatus according to an embodiment is summarized as a supply apparatus for supplying articles onto two independent distribution tables that each of two adjacent combination weighing mechanisms includes, the supply apparatus including: a conveyer including: a main conveyance path extending in a direction orthogonal to a straight line connecting respective centers of the two independent distribution tables; a first conveyance path connected continuously to the main conveyance path, the first conveyance path allowing the articles to be supplied to one of the two independent distribution tables; and a second conveyance path allowing the articles to be supplied to another of the two independent distribution tables; a blocker disposed at a fork between the main conveyance path, the first conveyance path, and the second conveyance path, the blocker making a switch between a first state where supply of the articles from the main conveyance path to the first conveyance path is blocked and a second state where supply of the articles from the main conveyance path to the second conveyance path is blocked; and a controller that transitions, based on respective conditions of supply of the articles to the two adjacent combination weighing mechanisms, the blocker into at least either the first state or the second state to switch a route of conveyance of the articles.

Advantageous Effects of the Invention

According to the present invention, it is possible to provide an article processing apparatus capable of sorting weighing targets efficiently and requiring no intricate mechanism between the supply apparatus and a weighing mechanism, leading to a low installation height.

DESCRIPTION OF EMBODIMENTS

Figure 1:
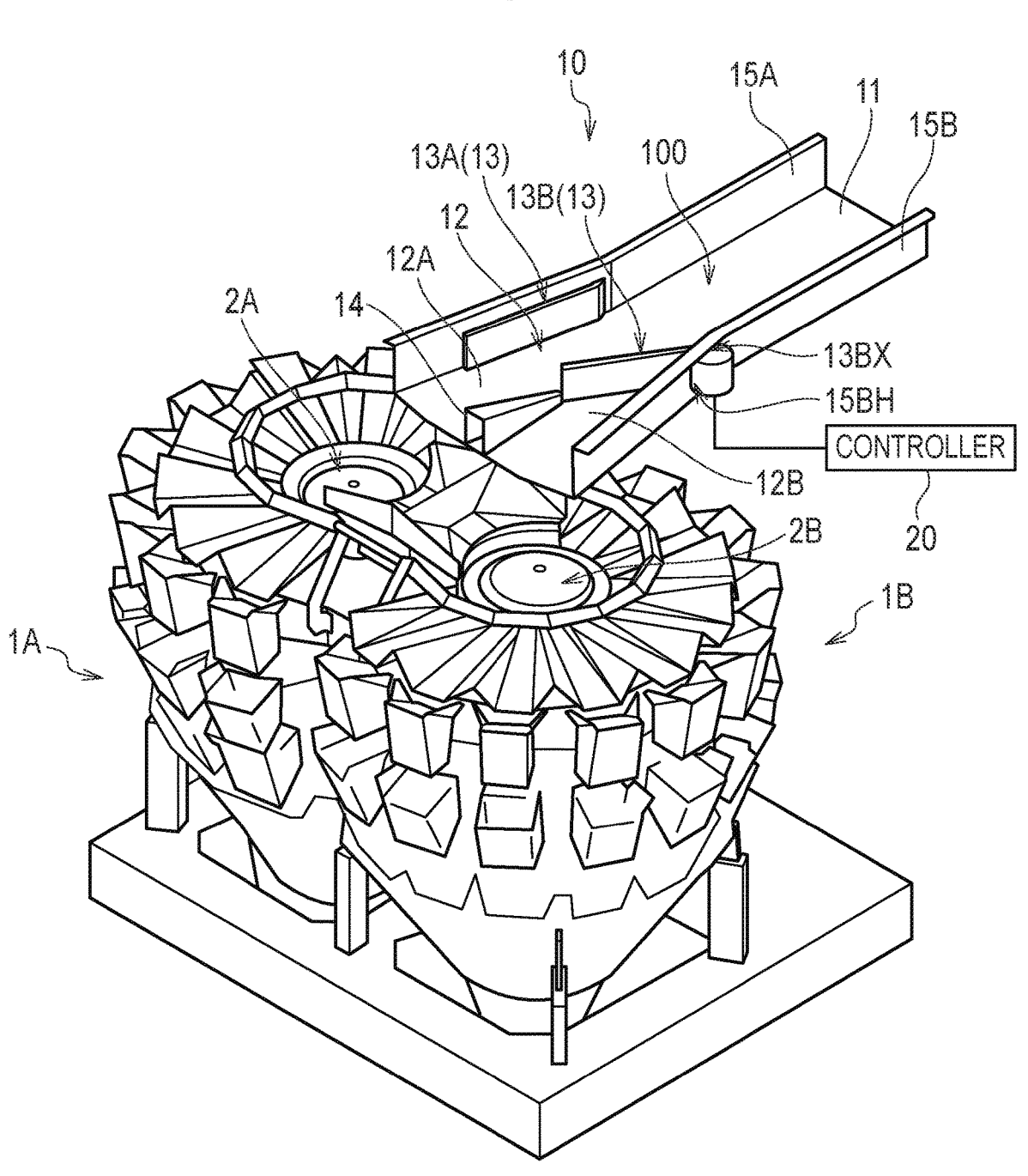
FIG. 1 is an explanatory view for an exemplary entire configuration of a combination weighing system including weighing mechanisms and a supply apparatus according to a first embodiment.

Hereinafter, the present embodiment will be described in detail with reference to the attached drawings. In the following description of the drawings, the same or similar parts are denoted by the same or similar reference symbols. However, note that the drawings are schematic, and ratios of dimensions are different from actual ones. Therefore, specific dimensions and the like are determined in consideration of the following description. Moreover, there may be portions where dimensional relationships or proportions are different among the drawings. In this specification and the drawings, elements having substantially the same function and configuration are denoted by the same reference numerals to omit redundant description, and elements not directly related to the present invention are omitted.

First Embodiment

A combination weighing system including weighing mechanisms 1A and 1B and a supply apparatus 10 according to a first embodiment of the present invention will be described below with reference to FIGS. 1 to 3.

As illustrated in FIG. 1, the supply apparatus 10 according to the present embodiment supplies articles onto two independent distribution tables 2A and 2B that the two adjacent combination weighing mechanisms 1A and 1B include, respectively.

Figure 2:
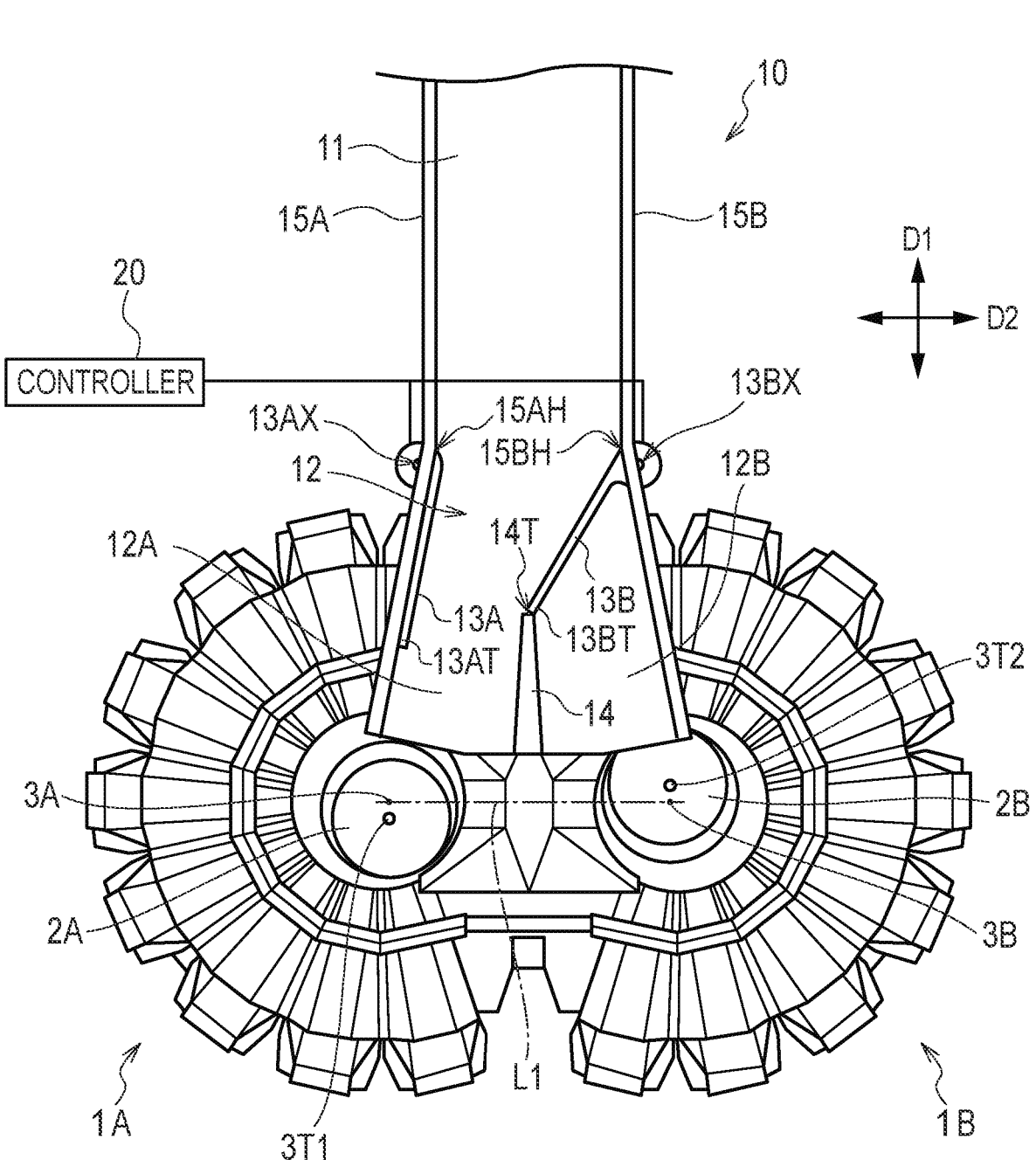
FIG. 2 is a top view of FIG. 1.

As illustrated in FIGS. 1 and 2, the supply apparatus 10 according to the present embodiment includes a conveyer 100, a blocker 13, and a controller 20.

As illustrated in FIGS. 1 and 2, the conveyer 100 includes a main conveyance path 11, a first conveyance path 12A, and a second conveyance path 12B.

As illustrated in FIG. 2, the main conveyance path 11 extends in a direction D1 orthogonal to a straight line L1 connecting the respective centers 3A and 3B of the distribution tables 2A and 2B. The respective tops 3T1 and 3T2 of the distribution tables 2A and 2B may be identical to the centers 3A and 3B of the distribution tables 2A and 2B, respectively, or may be eccentric to the centers 3A and 3B of the distribution tables 2A and 2B, respectively, as illustrated in FIG. 2. For example, the distribution tables 2A and 2B are each a member that conveys articles supplied by vibrations from a vibrator, circumferentially and outward. In this case, a composition of vibrations causes articles to be conveyed in a spiral on each of the distribution tables 2A and 2B.

The first conveyance path 12A is connected continuously to the main conveyance path 11 and supplies articles to the distribution table 2A that is one of the two distribution tables 2A and 2B. Meanwhile, the second conveyance path 12B supplies articles to the distribution table 2B that is the other of the two distribution tables 2A and 2B.

As illustrated in FIG. 2, the blocker 13 is disposed at a fork 12 between the main conveyance path 11, the first conveyance path 12A, and the second conveyance path 12B.

The blocker 13 makes a switch between a first state where supply of articles from the main conveyance path 11 to the first conveyance path 12A is blocked and a second state where supply of articles from the main conveyance path 11 to the second conveyance path 12B is blocked.

As illustrated in FIG. 2, in the supply apparatus 10 according to the present embodiment, a partition 14 may be provided at the center of the fork 12.

As illustrated in FIGS. 1 and 2, the blocker 13 may include a first blocker 13A and a second blocker 13B. The first blocker 13A blocks supply of articles from the main conveyance path 11 to the first conveyance path 12A. Meanwhile, the second blocker 13B blocks supply of articles from the main conveyance path 11 to the second conveyance path 12B.

Specifically, as illustrated in FIG. 2, the first blocker 13A may be achieved with a first arm extending from a side wall 15A of the supply apparatus 10. In such a case, in the first state, the leading end 13AT of the first arm is in contact with the partition 14 due to turning of the first arm (first blocker) 13A around a first axis 13AX, so that supply of articles from the main conveyance path 11 to the first conveyance path 12A can be blocked.

As illustrated in FIG. 2, the second blocker 13B may be achieved with a second arm extending from another side wall 15B of the supply apparatus 10. In such a case, in the second state, the leading end 13BT of the second arm is in contact with the partition 14 due to turning of the second arm (second blocker) 13B around a second axis 13BX, so that supply of articles from the main conveyance path 11 to the second conveyance path 12B can be blocked.

Based on the respective conditions of supply of articles to the two combination weighing mechanisms 1A and 1B, the controller 20 transitions the blocker 13 into at least either the first state or the second state to switch the route of conveyance of articles.

Note that, as illustrated in FIG. 2, the conveyer 100 may have a conveyance face of which the width in a direction D2 along the straight line L1 increases downstream. According to such a configuration, articles conveyed from the upstream side can be inhibited from being stuck in the neighborhood between the main conveyance path 11 and the first conveyance path 11A or the second conveyance path 11B, leading to smooth conveyance of articles.

In the supply apparatus 10 according to the present embodiment, the conveyer 100 and the side walls 15A and 15B may be formed of metal, such as stainless steel, and the first arm (first blocker) 13A and the second arm (second blocker) 13B may be formed of resin.

According to such a configuration, articles are hardly caught among the conveyer 100, the side walls 15A and 15B, the first arm 13A, and the second arm 13B, so that articles can be distributed accurately from the main conveyance path 11 to the first conveyance path 12A or the second conveyance path 12B.

Furthermore, in the supply apparatus 10 according to the present embodiment, as illustrated in FIGS. 1 and 2, the side walls 15A and 15B may have through holes 15AH and 15BH, respectively. In such a case, the first arm 13A and the second arm 13B extend, through the through holes 15AH and 15BH, outward from the side walls 15A and 15B, respectively. Then, the first axis 13AX and the second axis 13BX are located outside the side walls 15A and 15B, respectively. According to such a configuration, the blocker 13 is simple in configuration, and articles being conveyed on the main conveyance path 11 can be inhibited from being contaminated with foreign matter.

An exemplary operation of the combination weighing system according to the present embodiment will be described below with reference to FIG. 3.

Figure 3:
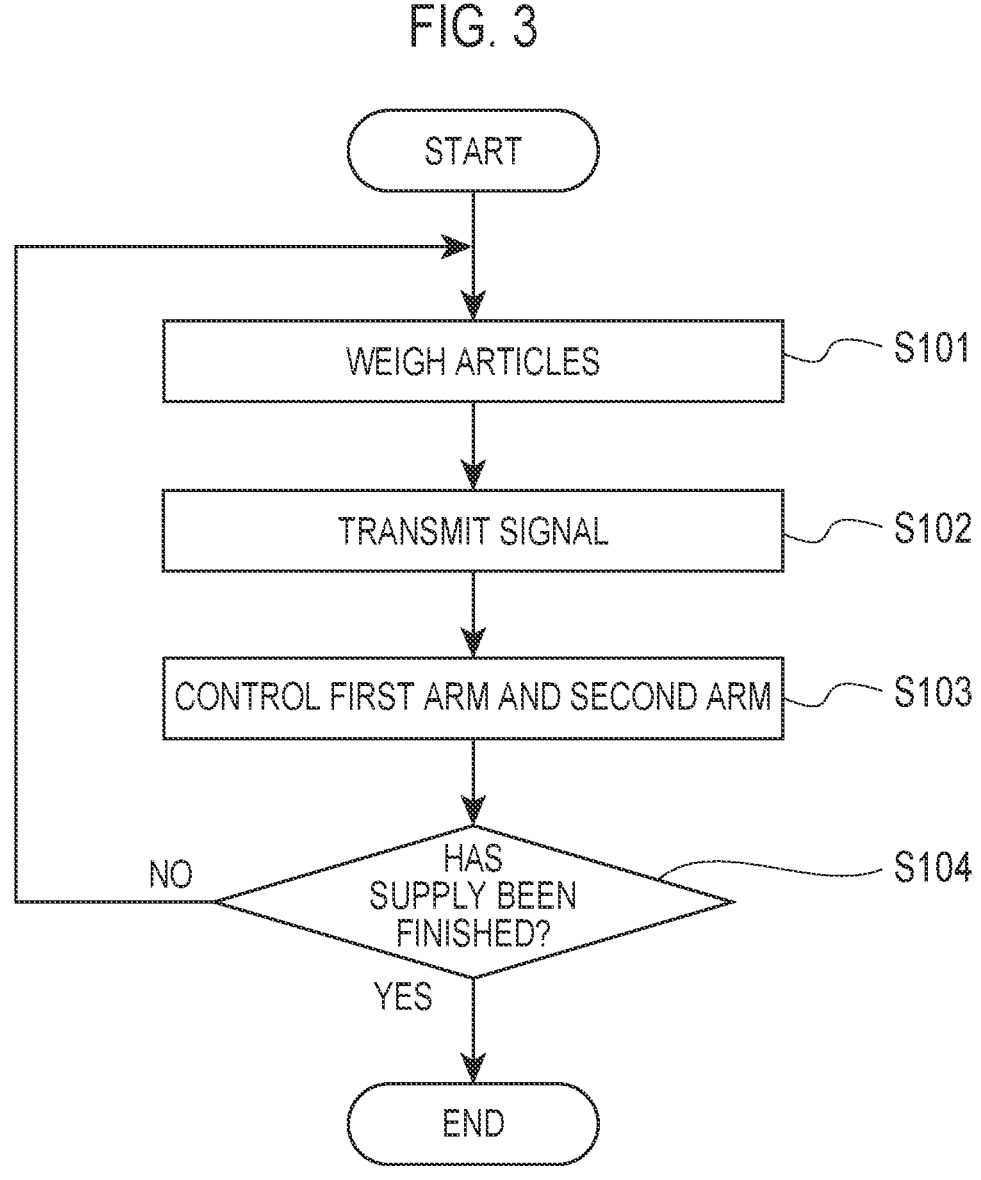
FIG. 3 is a flowchart for describing an exemplary operation of the combination weighing system according to the first embodiment.

As illustrated in FIG. 3, in step S101, a weight detector (not illustrated) provided below the distribution table 2A detects the weight of articles supplied from the supply apparatus 10 to the distribution table 2A, and a weight detector (not illustrated) provided below the distribution table 2B detects the weight of articles supplied from the supply apparatus 10 to the distribution table 2B.

In step S102, each weight detector transmits, to the controller 20, the detected weight of articles.

In step S103, based on the respective conditions of supply of articles to the two combination weighing mechanisms 1A and 1B, the controller 20 transitions the blocker 13 into at least either the first state or the second state to switch the route of conveyance of articles.

For example, in a case where a signal received in the first state indicates that the weight of articles is larger than a predetermined threshold, the controller 20 controls the first conveyance path 12A and the second conveyance path 12B such that the blocker 13 is brought into the second state to block the supply of articles from the main conveyance path 11 to the second conveyance path 12B and to supply articles from the main conveyance path 11 to the first conveyance path 12A.

On the other hand, in a case where a signal received in the second state indicates that the weight of articles is larger than a predetermined threshold, the controller 20 controls the first conveyance path 12A and the second conveyance path 12B such that the blocker 13 is brought into the first state to block the supply of articles from the main convey-ance path 11 to the first conveyance path 12A and to supply articles from the main conveyance path 11 to the second conveyance path 12B.

According to the present embodiment, with a low instal-lation height due to no intricate mechanism between the supply apparatus 10 and the weighing mechanisms 1A and 1B, weighing targets can be sorted efficiently.

Modification 1

Modification 1 of the present invention will be described below with a focus on the difference from the first embodi-ment.

Figure 4A:
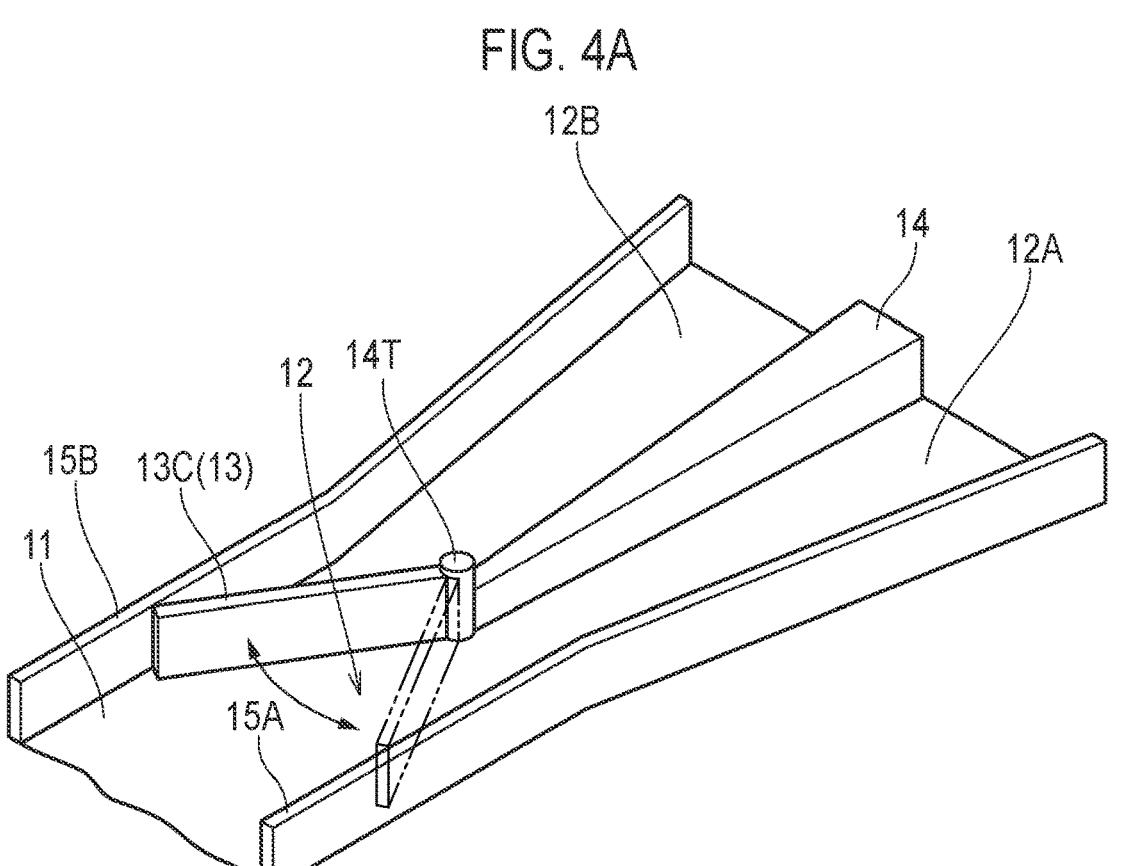
FIGS. 4A and 4B are explanatory views for an exemplary supply apparatus according to Modification 1.
Figure 4B:
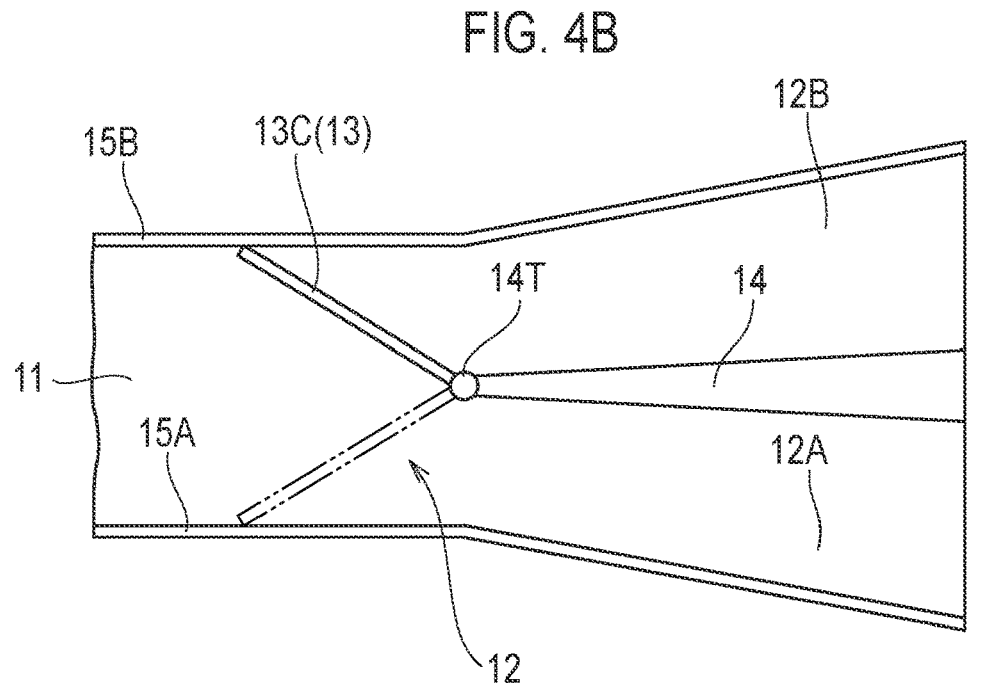

As illustrated in FIGS. 4A and 4B, a supply apparatus 10 according to Modification 1 may include a blocker 13 achieved with a single arm 13C connected to the leading end 14T on the upstream side of a partition 14.

In such a case, in the first state, the leading end of the arm 13C is in contact with a side wall 15A due to turning of the arm 13C around the leading end 14T, so that supply of articles from a main conveyance path 11 to a first convey-ance path 12A can be blocked.

On the other hand, in the second state, the leading end of the arm 13C is in contact with another side wall 15B due to turning of the arm 13C around the leading end 14T, so that supply of articles from the main conveyance path 11 to a second conveyance path 12B can be blocked.

Modification 2

Modification 2 of the present invention will be described below with a focus on the difference from the first embodi-ment.

Figure 5:
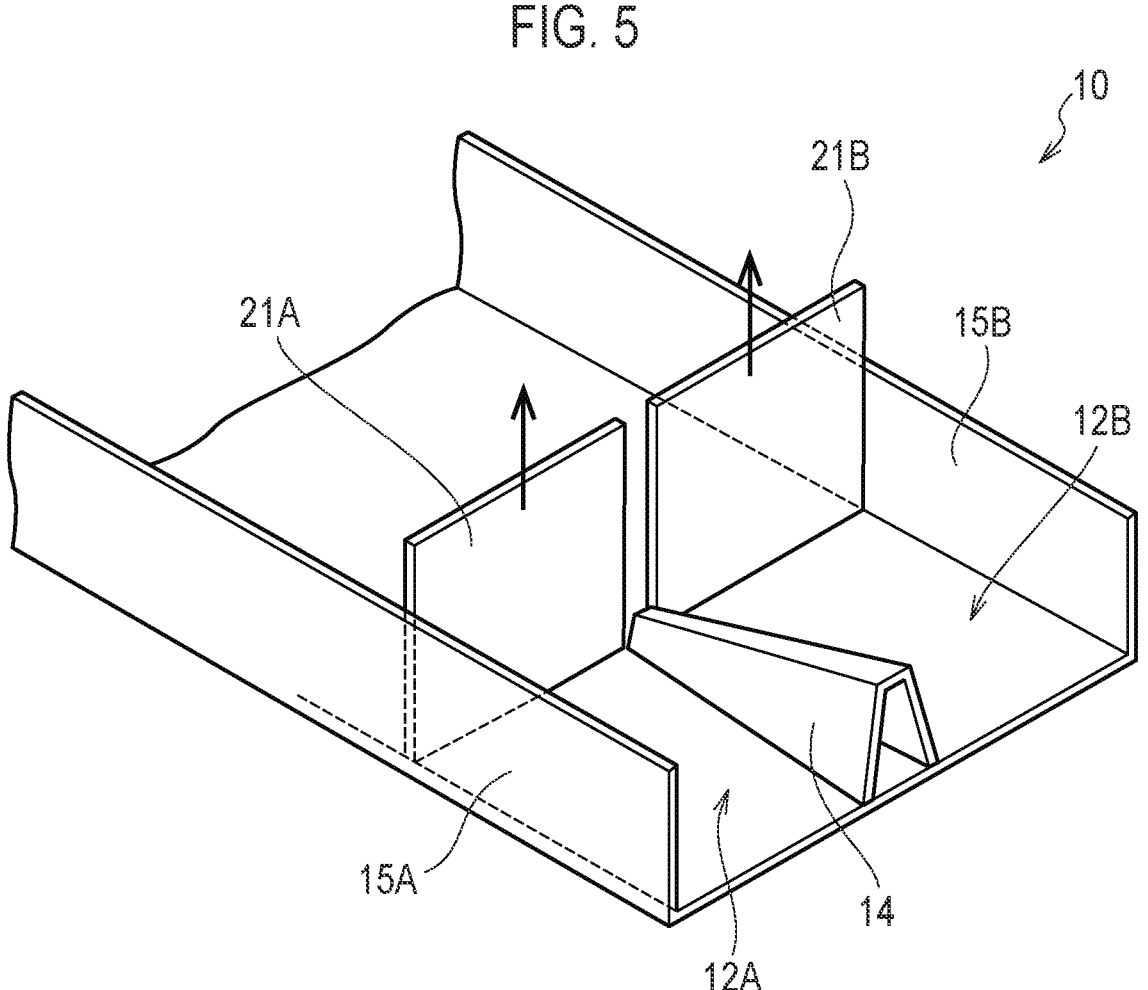
FIG. 5 is an explanatory view for an exemplary supply apparatus according to Modification 2.

As illustrated in FIG. 5, a supply apparatus 10 according to Modification 2 may include a tabular member 21A as a first blocker 13A and a tabular member 21B as a second blocker 13B.

The tabular member 21A blocks supply of articles from a main conveyance path 11 to a first conveyance path 12A. Meanwhile, the tabular member 21B blocks supply of articles from the main conveyance path 11 to a second conveyance path 12B.

Specifically, as illustrated in FIG. 5, in the first state, the tabular member 21A protrudes from the conveyance face of a conveyer 100 and the tabular member 21B is retracted through the conveyance face of the conveyer 100, so that supply of articles from the main conveyance path 11 to the first conveyance path 12A can be blocked.

As illustrated in FIG. 5, in the second state, the tabular member 21B protrudes from the conveyance face of the conveyer 100 and the tabular member 21A is retracted through the conveyance face of the conveyer 100, so that supply of articles from the main conveyance path 11 to the second conveyance path 12B can be blocked.

Modification 3

Modification 3 of the present invention will be described below with a focus on the difference from the first embodi-ment.

Figure 6A:
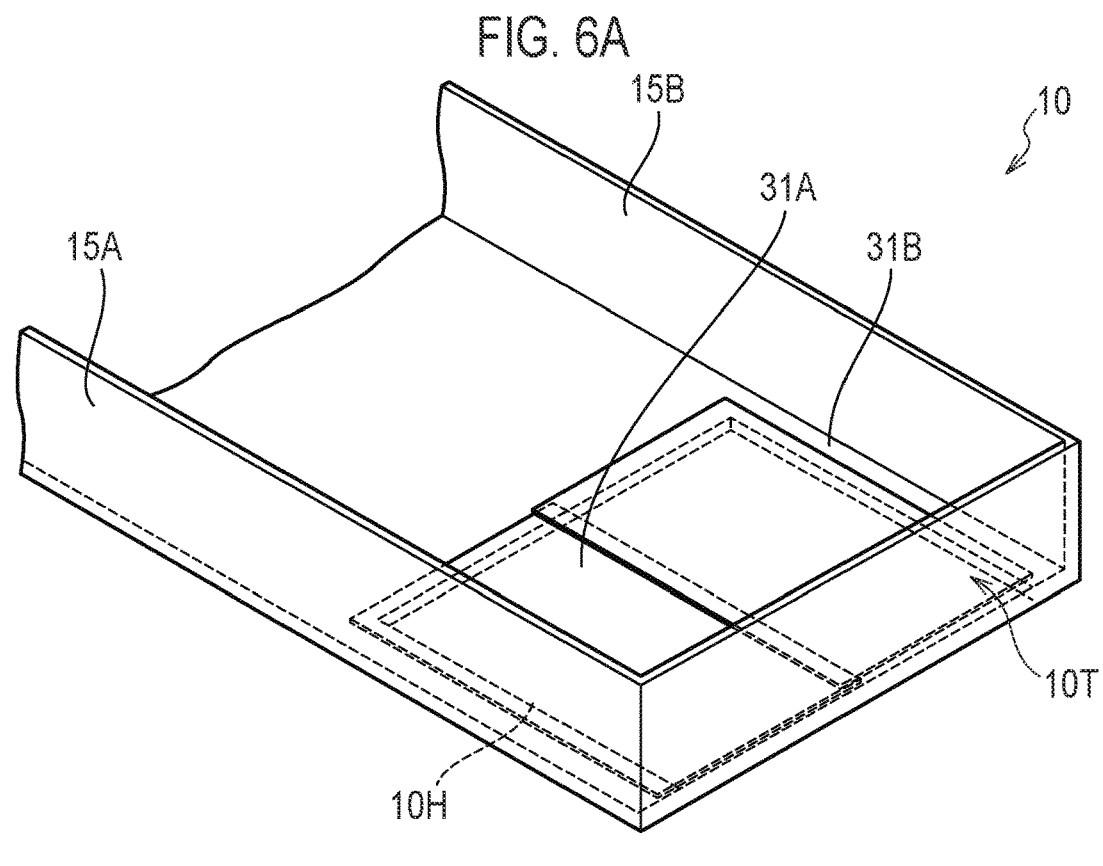
FIGS. 6A and 6B are explanatory views for an exemplary supply apparatus according to Modification 3.

As illustrated in FIG. 6A, a supply apparatus 10 according to Modification 3 includes a lower end wall 10T at its end on the downstream side such that no articles are supplied from the end on the downstream side to distribution tables 2A and 2B.

As illustrated in FIG. 6A, the supply apparatus 10 accord-ing to Modification 3 has a conveyance face provided with a through hole 10H near the lower end wall 10T.

Figure 6B:
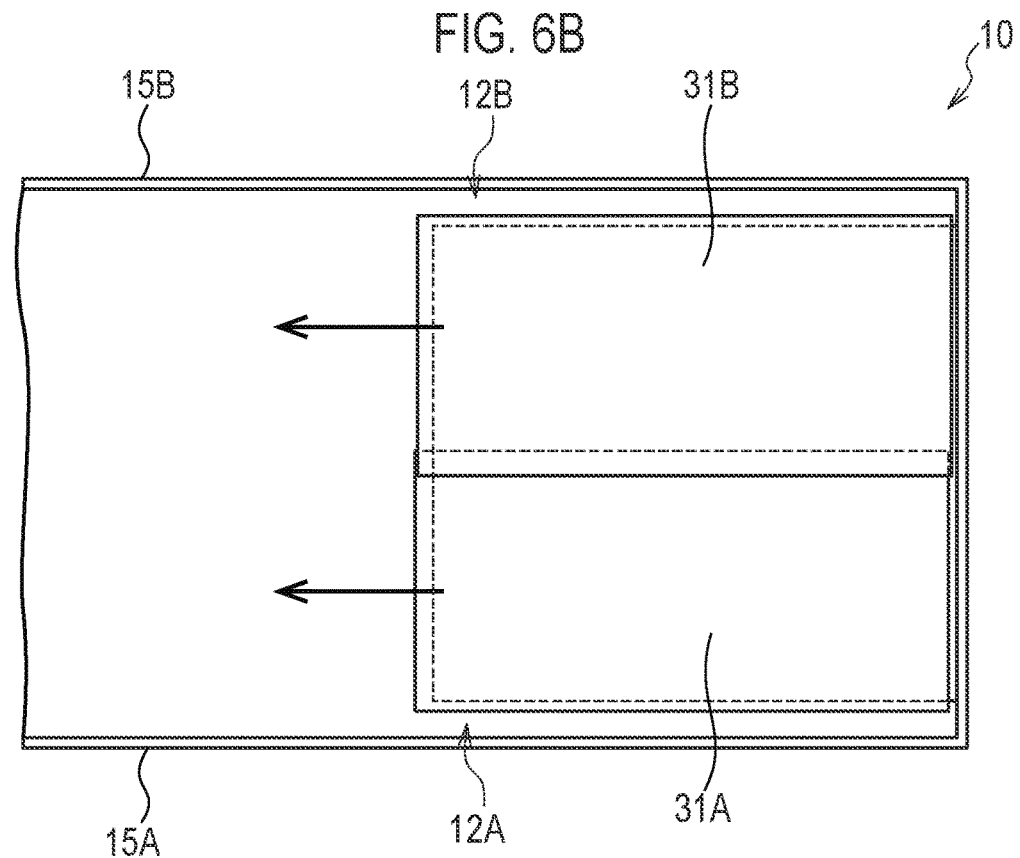

As illustrated in FIG. 6B, a tabular member 31A may be provided as a first blocker 13A, and a tabular member 31B may be provided as a second blocker 13B.

The tabular member 31A blocks supply of articles from a main conveyance path 11 to a first conveyance path 12A. Meanwhile, the tabular member 31B blocks supply of articles from the main conveyance path 11 to a second conveyance path 12B.

Specifically, as illustrated in FIG. 6B, in the first state, the tabular member 31A covers part of the through hole 10H and the tabular member 31B is located upstream due to its movement, so that supply of articles from the main convey-ance path 11 to the first conveyance path 12A can be blocked. In such a case, articles are supplied to a distribution table 2B through part of the through hole 10H, in which the part is exposed due to the movement of the tabular member 31B.

On the other hand, as illustrated in FIG. 6B, in the second state, the tabular member 31B covers part of the through hole 10H and the tabular member 31A is located upstream due to its movement, so that supply of articles from the main conveyance path 11 to the second conveyance path 12B can be blocked. In such a case, articles are supplied to a distribution table 2A through part of the through hole 10H, in which the part is exposed due to the movement of the tabular member 31A.

Although the present invention is explained in detail using the above-mentioned embodiments, it will be apparent to those skilled in the art that the present invention is not limited to the embodiments described herein. The present invention can be implemented as modifications and changes without departing from the spirit and scope of the present invention defined by the description of the claims. Accord-ingly, the description of the present specification is for the purpose of illustration and is not intended to limit the present invention in any way.

What is claimed is:

1. A supply apparatus for supplying articles to two adja-cent combination weighing mechanisms, each of the two adjacent combination mechanisms including an independent distribution table, the supply apparatus comprising:
   a conveyer including:
      a main conveyance path extending in a direction orthogonal to a straight line connecting respective centers of the two independent distribution tables;
      a first conveyance path connected continuously to the main conveyance path, the first conveyance path allowing the articles to be supplied to one of the two independent distribution tables; and
      a second conveyance path allowing the articles to be supplied to another of the two independent distribu-tion tables;
   a blocker disposed at a fork between the main conveyance path, the first conveyance path, and the second con-veyance path, the blocker making a switch between a first state where supply of the articles from the main conveyance path to the first conveyance path is blocked and a second state where supply of the articles from the main conveyance path to the second conveyance path is blocked; and
   a controller that transitions, based on a supply condition of the articles to the two adjacent combination weighing mechanisms, the blocker into at least either the first state or the second state to switch a route of conveyance of the articles.

2. The supply apparatus according to claim 1, wherein the blocker includes:

a first blocker that blocks the supply of the articles from the main conveyance path to the first conveyance path; and a second blocker that blocks the supply of the articles from the main conveyance path to the second conveyance path, a partition is provided at a center of the fork, the first blocker includes a first arm extending from a side wall of the supply apparatus, a leading end of the first arm comes in contact with the partition due to turning of the first arm around a first axis such that the supply of the articles from the main conveyance path to the first conveyance path is blocked, the second blocker includes a second arm extending from another side wall of the supply apparatus, and a leading end of the second arm comes in contact with the partition due to turning of the second arm around a second axis such that the supply of the articles from the main conveyance path to the second conveyance path is blocked.

3. The supply apparatus according to claim 1, wherein the conveyer has a conveyance face of which a width in a direction along the straight line increases downstream.

4. The supply apparatus according to claim 2, wherein the conveyer, the side wall, and the another side wall are formed of metal, and the first arm and the second arm are formed of resin.

5. The supply apparatus according to claim 2, wherein the side wall and the another side wall have respective through holes, the first arm and the second arm extend outward from the side wall and the another side wall through the respective through holes, and the first axis and the second axis are located outside the side wall and the another side wall, respectively.

\* \* \* \* \*